(12) United States Patent
Morikawa et al.

(10) Patent No.: US 10,663,348 B2
(45) Date of Patent: May 26, 2020

(54) COLORIMETRIC SENSOR DEVICE AND IMAGE FORMATION APPARATUS

(71) Applicant: KONICA MINOLTA, INC., Chiyoda-ku (JP)

(72) Inventors: Takuma Morikawa, Sakai (JP); Masafumi Hashimoto, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 133 days.

(21) Appl. No.: 15/533,848

(22) PCT Filed: Nov. 20, 2015

(86) PCT No.: PCT/JP2015/082757
§ 371 (c)(1),
(2) Date: Jun. 7, 2017

(87) PCT Pub. No.: WO2016/093043
PCT Pub. Date: Jun. 16, 2016

(65) Prior Publication Data
US 2019/0086264 A1 Mar. 21, 2019

(30) Foreign Application Priority Data
Dec. 8, 2014 (JP) .................................. 2014-248001

(51) Int. Cl.
| | | |
|---|---|---|
| *G01J 3/50* | (2006.01) | |
| *G01N 21/27* | (2006.01) | |
| *G01J 3/02* | (2006.01) | |
| *G01N 21/15* | (2006.01) | |
| *G01J 3/10* | (2006.01) | |
| *G01N 21/47* | (2006.01) | |

(Continued)

(52) U.S. Cl.
CPC .............. *G01J 3/50* (2013.01); *G01J 3/0202* (2013.01); *G01J 3/0205* (2013.01); *G01J 3/027* (2013.01);
(Continued)

(58) Field of Classification Search
CPC .................................. G01N 21/251; G01J 3/50
See application file for complete search history.

(56) References Cited

U.S. PATENT DOCUMENTS 4,003,660 A * 1/1977 Christie, Jr. ........ B41F 33/0036
356/407
6,359,212 B1 * 3/2002 Hall ..................... G01N 17/004
136/256

(Continued)

FOREIGN PATENT DOCUMENTS

| EP | 2620284 | 7/2013 |
|---|---|---|
| JP | 11-202696 | 7/1999 |

(Continued)

OTHER PUBLICATIONS

Office Action dated Jun. 18, 2019 issued in Japanese Patent Application No. 2016-563596.

*Primary Examiner* — Dominic J Bologna
(74) *Attorney, Agent, or Firm* — Cozen O'Connor

(57) ABSTRACT

A housing (20) has a passage port (3) that serves as both the outlet for the illumination light (IL) to go out of the housing (20) toward a sample surface (S) and the inlet for the reflection light (RL) reflected on the sample surface (S) to enter the housing (20). A transparent member (19) is disposed at the passage port (3) to prevent dust including paper dust from entering the housing (20). A light quantity calculation unit (71) calculates the light quantity of light received by a light reception lens (33). A notification unit (81) performs a predetermined notification when the light quantity is less than or equal to a predetermined value.

6 Claims, 10 Drawing Sheets

(51) Int. Cl.
*G01N 21/25* (2006.01)
*G01J 3/46* (2006.01)
*G03G 15/01* (2006.01)
*G03G 15/00* (2006.01)
*G03G 21/00* (2006.01)

(52) U.S. Cl.
CPC ........... *G01J 3/0291* (2013.01); *G01J 3/0297* (2013.01); *G01J 3/10* (2013.01); *G01J 3/46* (2013.01); *G01N 21/15* (2013.01); *G01N 21/251* (2013.01); *G01N 21/27* (2013.01); *G01N 21/47* (2013.01); *G03G 15/01* (2013.01); *G03G 15/5062* (2013.01); *G01J 2003/102* (2013.01); *G01J 2003/106* (2013.01); *G01N 2021/157* (2013.01); *G03G 21/00* (2013.01)

(56) References Cited

U.S. PATENT DOCUMENTS

| | | | |
|---|---|---|---|
| 2002/0122192 A1* | 9/2002 | Ott | G01J 3/02 358/1.9 |
| 2004/0106068 A1* | 6/2004 | Dierichs | G03F 7/70558 430/311 |
| 2005/0206978 A1* | 9/2005 | Sone | H04N 1/00002 358/516 |
| 2006/0192957 A1 | 8/2006 | Frick et al. | |
| 2007/0153277 A1 | 7/2007 | Shakespeare et al. | |
| 2008/0174763 A1 | 7/2008 | Ehbets et al. | |
| 2012/0105851 A1* | 5/2012 | Kobayashi | G01J 3/02 356/402 |
| 2013/0004188 A1 | 1/2013 | Suzuki | |
| 2013/0242299 A1 | 9/2013 | Kobayashi et al. | |
| 2014/0029963 A1* | 1/2014 | Nakai | G01J 1/0488 399/39 |
| 2014/0185047 A1 | 7/2014 | Tajima et al. | |

FOREIGN PATENT DOCUMENTS

| | | |
|---|---|---|
| JP | 2006-177960 | 7/2006 |
| JP | 2011-22114 | 2/2011 |
| JP | 2012-93294 | 5/2012 |
| JP | 2013-15575 | 1/2013 |
| JP | 2014-131205 | 7/2014 |

* cited by examiner

COLORIMETRIC SENSOR DEVICE AND IMAGE FORMATION APPARATUS

RELATED APPLICATIONS

This is a U.S. National Phase Application under 35 USC 371 of International Application PCT/JP2015/082757 filed on Nov. 20, 2015.

This application claims the priority of Japanese application no. 2014-248001 filed Dec. 8, 2014, the entire content of which is hereby incorporated by reference.

TECHNICAL FIELD

The present invention relates to a colorimetric sensor device used in, for example, an image formation apparatus to measure the color of a color patch formed on a sheet and an image formation apparatus including the colorimetric sensor device.

BACKGROUND ART

An image formation apparatus includes a conveyance path where a sheet is conveyed, and an image formation unit where an image represented by image data is formed on the sheet conveyed using the conveyance path. As the image formation apparatus operates to convey sheets, paper dust is generated from the sheet.

In order to increase the color reproducibility, some of the image formation apparatuses capable of color printing have a color sensor in the conveyance path, measures the color of a color patch formed on a sheet, and calibrates the color.

The paper dust on the white calibration plate to be measured with the color sensor deteriorates the measurement accuracy. In view of this, the image formation apparatus in which the white reference plate (white calibration plate) is covered with a shutter and the shutter covering the white reference plate is moved to a retraction position when the white reference plate is measured with the color sensor has been suggested (for example, see Patent Literature 1).

This type of color sensor is to measure the color of a sample surface by reflecting the illumination light from a light source on the sample surface, receiving the reflected light with a light reception lens, and analyzing the received reflection light. The light source and the light reception lens are housed in a housing, and the housing has a light passage port serving as both the outlet for the illumination light and the inlet for the reflection light.

In the case of the image formation apparatus where the printing is executed at high speed (for example, a production printer), the paper dust is generated in large quantity. In an aspect conceived in order to prevent the paper dust from covering the light reception lens and the light source, the light passage port is closed with a transparent member such as a transparent glass plate.

In this aspect, however, a large quantity of paper dust adheres to the glass plate and it is therefore necessary to avoid the decrease in colorimetric accuracy because of the paper dust.

Thus, in regard to the colorimetric sensor device used under circumstances where the dust such as the paper dust is generated, the technique to avoid the decrease in colorimetric accuracy has been desired.

CITATION LIST

Patent Literature

Patent Literature 1: JP 2014-131205 A (Abstract)

SUMMARY OF INVENTION

It is an object of the present invention to provide a colorimetric sensor device and an image formation apparatus including the same, which can prevent the decrease in colorimetric accuracy under the circumstances where the dust is generated.

To achieve the above object, a colorimetric sensor device according to a first aspect of the present invention includes: a sensor head that includes a housing with a light passage port, a light reception lens housed in the housing, a transparent member disposed at the passage port, and a colorimetric unit converting light received by the light reception lens through the transparent member into an electric signal, and outputs the electric signal; a light quantity calculation unit that calculates a light quantity of the light received by the light reception lens by using the electric signal output from the sensor head; a first determination unit that determines whether the light quantity calculated by the light quantity calculation unit is less than or equal to a predetermined value; and a notification unit that performs a predetermined notification when the first determination unit has determined that the light quantity is less than or equal to the predetermined value.

To achieve the above object, a colorimetric sensor device according to a second aspect of the present invention includes: a sensor head that includes a housing with a light passage port, a transparent member disposed at the passage port, a first light source unit housed in the housing and emitting illumination light to be delivered to a sample surface through the transparent member, and a light reception lens housed in the housing and receiving reflection light reflected on the sample surface through the transparent member, converts the reflection light received by the light reception lens through the transparent member into an electric signal, and outputs the electric signal; a second light source unit that irradiates the transparent member with an ultraviolet ray; a light quantity calculation unit that calculates a light quantity of the light received by the light reception lens by using the electric signal output from the sensor head when the transparent member is irradiated with the ultraviolet ray from the second light source unit; a determination unit that determines whether the light quantity calculated by the light quantity calculation unit is more than or equal to a predetermined value; and a notification unit that performs a predetermined notification when the determination unit has determined that the light quantity is more than or equal to the predetermined value.

To achieve the above object, an image formation apparatus according to a third aspect of the present invention includes: a conveyance path where a sheet is conveyed; an image formation unit where an image represented by image data is formed on the sheet conveyed along the conveyance path; and the colorimetric sensor device that measures a color of the image formed on the sheet.

The aforementioned aspects, the object, the features, and the advantageous effects of the present invention will be made apparent from the detailed description below and the attached drawings.

DESCRIPTION OF EMBODIMENTS

Embodiments of the present invention will hereinafter be described in detail with reference to the drawings. In each drawing, the structures denoted by the same reference sign are the same structure, and the description made on that structure is not repeated.

Figure 1:
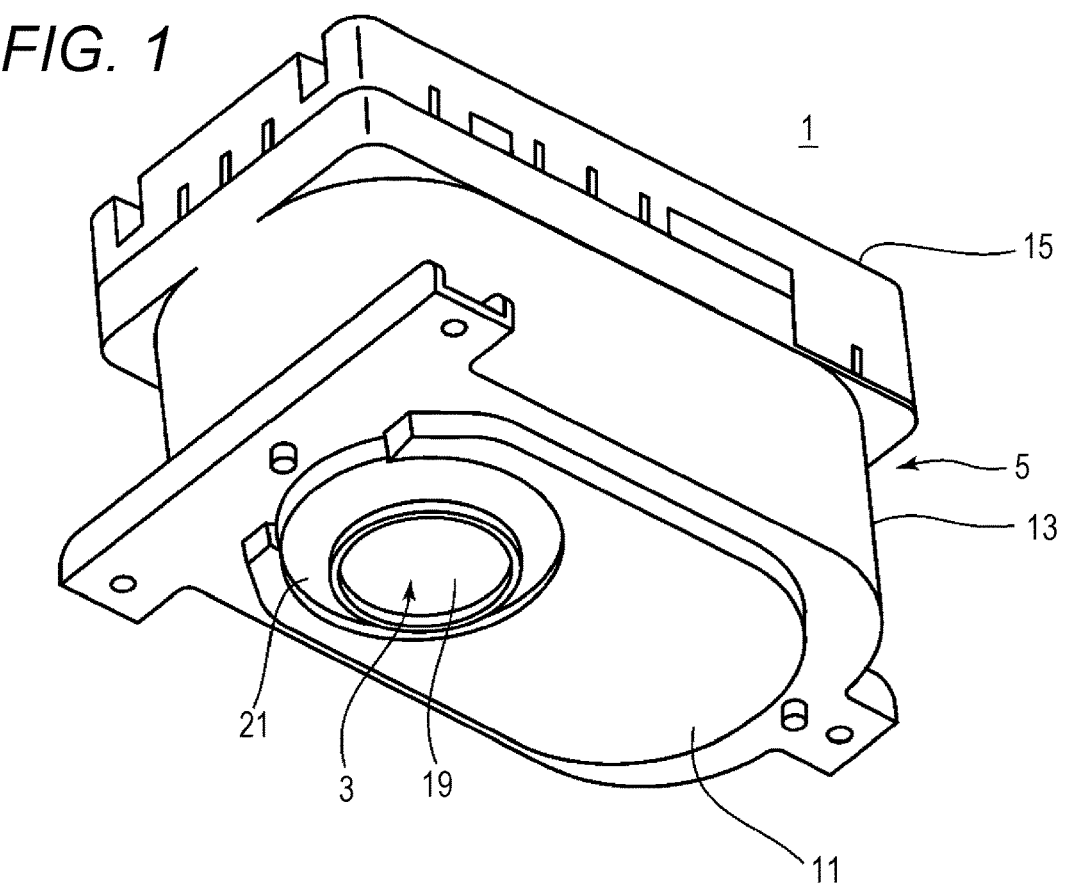
FIG. 1 is a perspective view illustrating an external appearance of a sensor head in a colorimetric sensor device according to a first embodiment, which is seen from a passage port for the illumination light.
Figure 2:
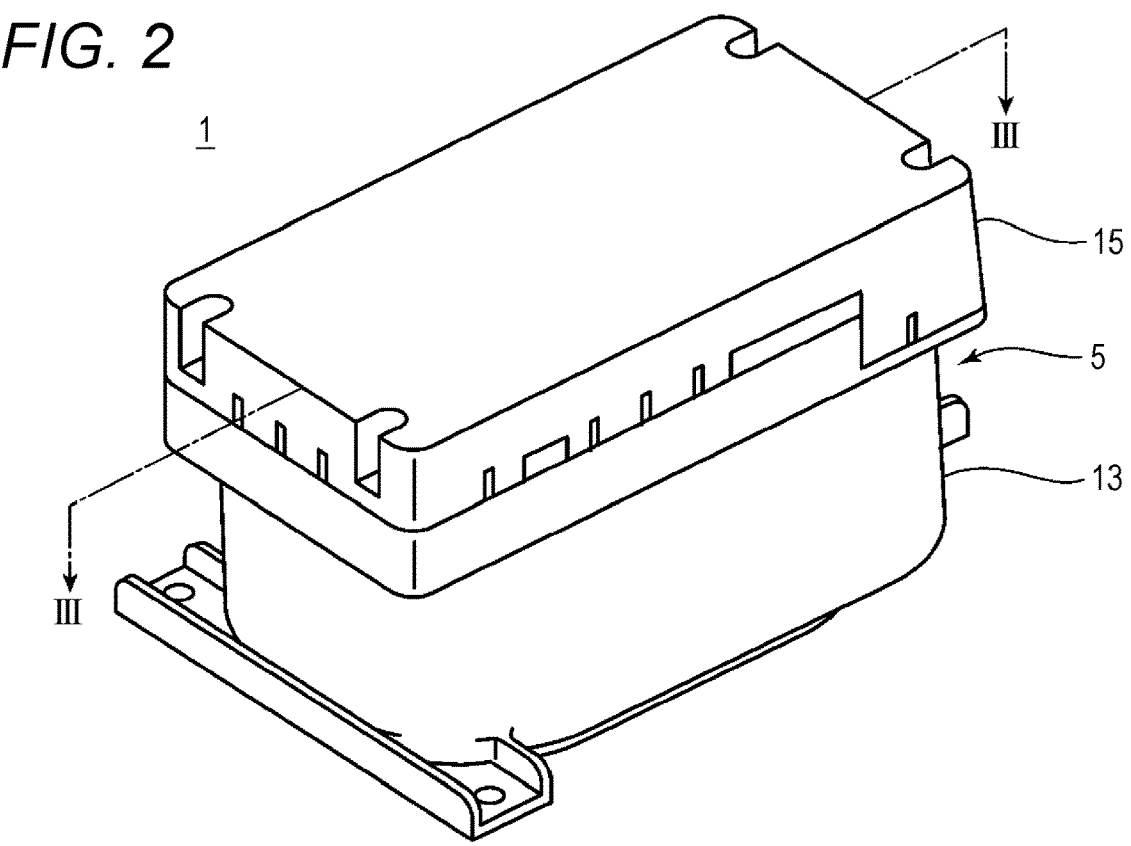
FIG. 2 is a perspective view illustrating the external appearance of the sensor head, which is seen from the opposite side of the passage port.
Figure 3:
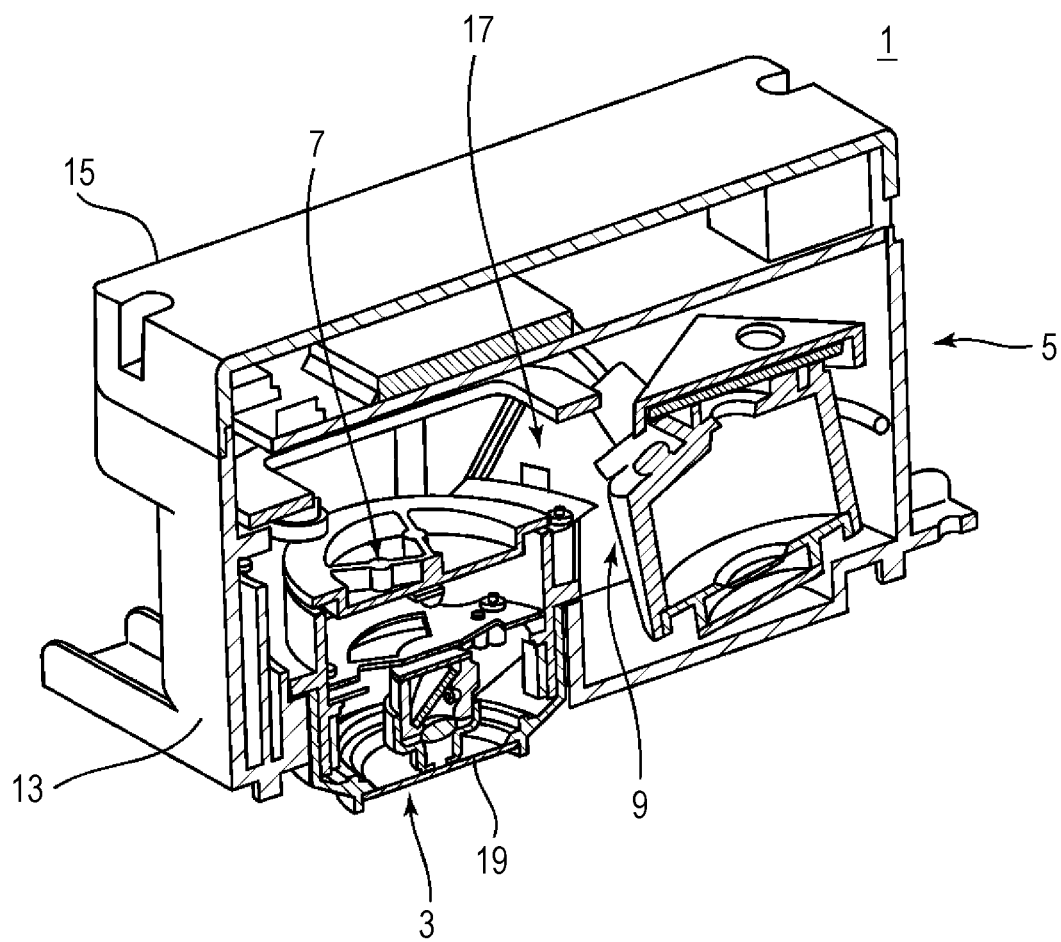
FIG. 3 is a cross-sectional view of the sensor head illustrated in FIG. 2, which is taken along a line III-III.

A colorimetric sensor device according to a first embodiment will be described. FIG. 1 is a perspective view illustrating an external appearance of a sensor head 1 in the colorimetric sensor device according to the first embodiment, which is seen from a passage port 3 for the illumination light. FIG. 2 is a perspective view illustrating the external appearance of the sensor head 1, which is seen from the opposite side of the passage port 3. FIG. 3 is a cross-sectional view of the sensor head 1 illustrated in FIG. 2, which is taken along a line III-III.

With reference to FIG. 3, the sensor head 1 includes a housing 5, an illumination light reception unit 7, and a spectroscopic unit 9 as a colorimetric unit.

With reference to FIG. 1 and FIG. 2, the housing 5 includes a bottom wall part 11, a side wall part 13, and a cover 15, and the bottom wall part 11 and the side wall part 13 constitute a space portion 17 illustrated in FIG. 3.

With reference to FIG. 1 and FIG. 3, the housing 5 is open on the side opposite to the bottom wall part 11. The cover 15 is fitted to a part of the housing 5 on the side opposite to the bottom wall part 11. The illumination light reception unit 7 and the spectroscopic unit 9 as the colorimetric unit are housed in the space portion 17.

Figure 4:
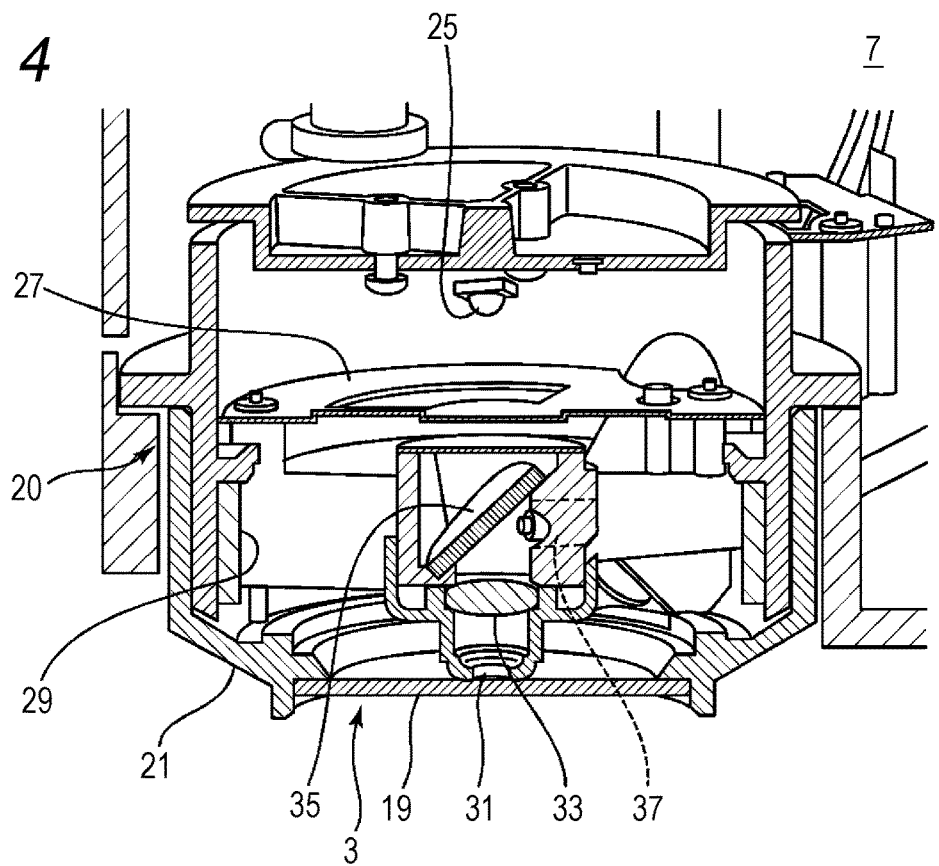
FIG. 4 is a magnified view in which an illumination light reception unit illustrated in FIG. 3 is magnified.
Figure 5:
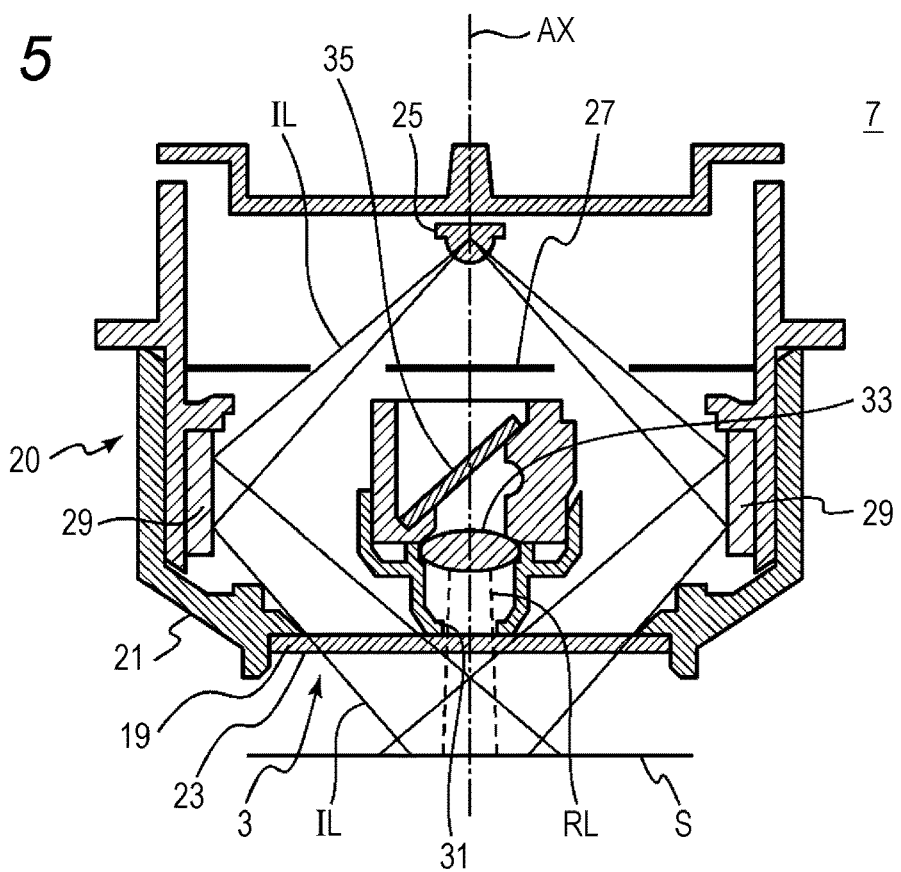
FIG. 5 is a cross-sectional view illustrating the illumination light reception unit.

The illumination light reception unit 7 will be described. FIG. 4 is a magnified view in which the illumination light reception unit 7 illustrated in FIG. 3 is magnified. FIG. 5 is a cross-sectional view illustrating the illumination light reception unit 7. With reference to FIG. 4 and FIG. 5, the illumination light reception unit 7 includes a housing 20, a transparent member 19, a light source unit 25, an opening 27, a cylindrical mirror 29, an opening 31, a light reception lens 33, and a plane mirror 35.

The housing 20 houses the light source unit 25 the opening 27, the cylindrical mirror 29, the opening 31, the light reception lens 33, and the plane mirror 35. On an optical axis AX, the light source unit 25, the plane mirror 35, the light reception lens 33, and the opening 31 are arranged in this order.

The housing 20 has a bottom part 21 exposed to the outside of the sensor head 1 from the bottom wall part 11 of the housing 5 (FIG. 1). The bottom part 21 is provided with the light passage port 3. The passage port 3 serves as an outlet through which illumination light IL goes out of the housing 20 toward a sample surface S, and also as an inlet through which reflection light RL corresponding to the illumination light IL reflected on the sample surface S enters the housing 20.

In order to prevent the paper dust (one example of dust) from entering the housing 20, the transparent member 19 is disposed to close the passage port 3. In this embodiment, a transparent glass plate with approximately the same area and approximately the same shape as those of the passage port 3 is used as the transparent member 19. It is only necessary that the material of the transparent member 19 can transmit the illumination light IL and the reflection light RL, and for example, a transparent plastic plate can be used as the transparent member 19. The transparent member 19 has its outer peripheral part retained by the bottom part 21.

The transparent member 19 is exposed to the outside of the housing 20 (i.e., to the outside of the sensor head 1), and has an exposed surface 23 located on the passage port 3.

The light source unit 25 is, for example, a white LED, and emits the white illumination light IL. The illumination light IL emitted from the light source unit 25 is narrowed by the opening 27 corresponding to the diaphragm of the illumination light IL, and then is delivered to the inner peripheral surface of the cylindrical mirror 29. The illumination light IL reflected on the inner peripheral surface of the cylindrical mirror 29 serves as the ring illumination and is delivered to the sample surface S through the transparent member 19.

The opening 31 is positioned in the optical path of the reflection light RL generated when the illumination light IL emitted from the light source unit 25 is delivered to the sample surface S and reflected on the sample surface S. The reflection light RL reflected on the sample surface S transmits through the transparent member 19 and is narrowed by the opening 31 and received by the light reception lens 33. A component of the reflection light RL that transmits through the opening 31 is illustrated in the drawing. The opening 31 narrows the reflection light RL.

The reflection light RL received by the light reception lens 33 is reflected on the plane mirror 35 and then enters an optical fiber 37 (FIG. 4). The optical fiber 37 connects between the illumination light reception unit 7 and the spectroscopic unit 9, and the reflection light RL having entered the optical fiber 37 is guided to the spectroscopic unit 9 and the colorimetry is performed.

Figure 6:
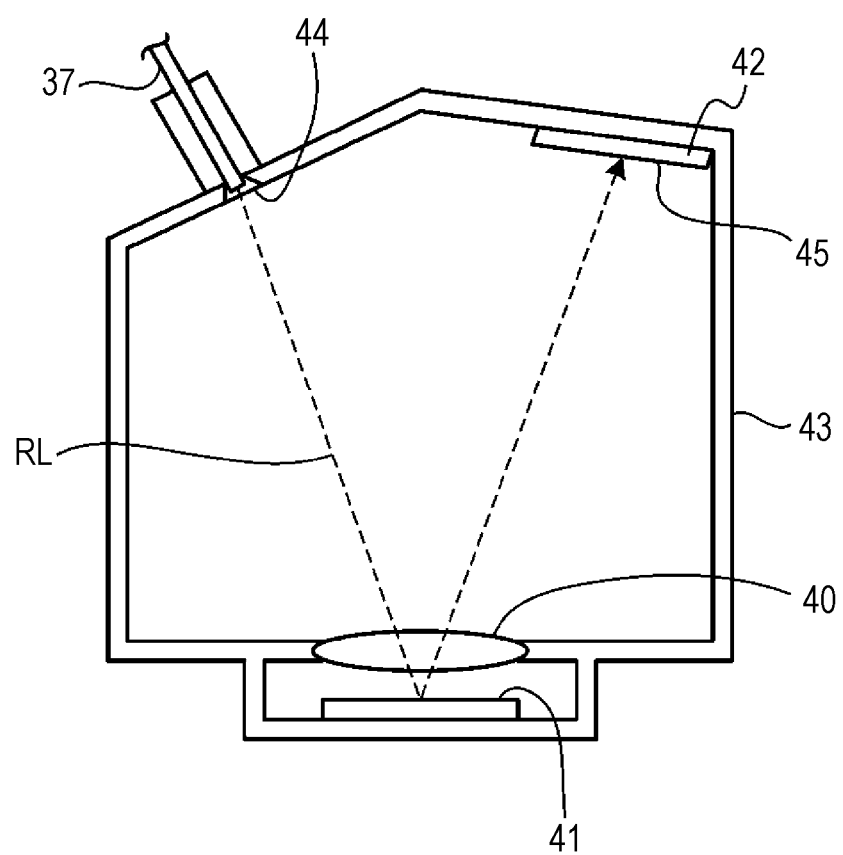
FIG. 6 is a cross-sectional view of a spectroscopic unit.

The spectroscopic unit 9 is described. FIG. 6 is a cross-sectional view of the spectroscopic unit 9. The spectroscopic unit 9 includes, for example, an imaging optical system 40, a reflection type diffraction grating 41, a line sensor 42, and a housing 43 for housing the imaging optical system 40, the reflection type diffraction grating 41, and the line sensor 42.

The housing 43 has a box-like shape and is formed of a material that blocks light with a wavelength range that can be received by the line sensor 42. One side surface of the housing 43 is provided with an incidence opening 44 (for example, a slit) where the reflection light RL emitted from the optical fiber 37 is guided into the housing 43.

The reflection light RL having entered through the incidence opening 44 enters the imaging optical system 40 and is made parallel (collimated) by the imaging optical system 40. Then, the light enters the reflection type diffraction grating 41 and is diffracted and reflected by the reflection type diffraction grating 41. The resulting reflected light enters the imaging optical system 40 again, and the light is imaged by the imaging optical system 40 as a wavelength dispersion image of the optical image on a light reception surface 45 of the line sensor 42.

The line sensor 42 includes a plurality of photoelectric conversion elements arranged in one direction. The photoelectric conversion element is, for example, a silicon photodiode (SPD) or the like. The line sensor 42 performs the photoelectric conversion on the wavelength dispersion image of the optical image formed on the light reception surface 45 with each of the plurality of photoelectric conversion elements, and thus generates electric signals representing the intensity level of each wavelength. The line sensor 42 then outputs the electric signals to a control unit 70 (FIG. 7).

Figure 7:
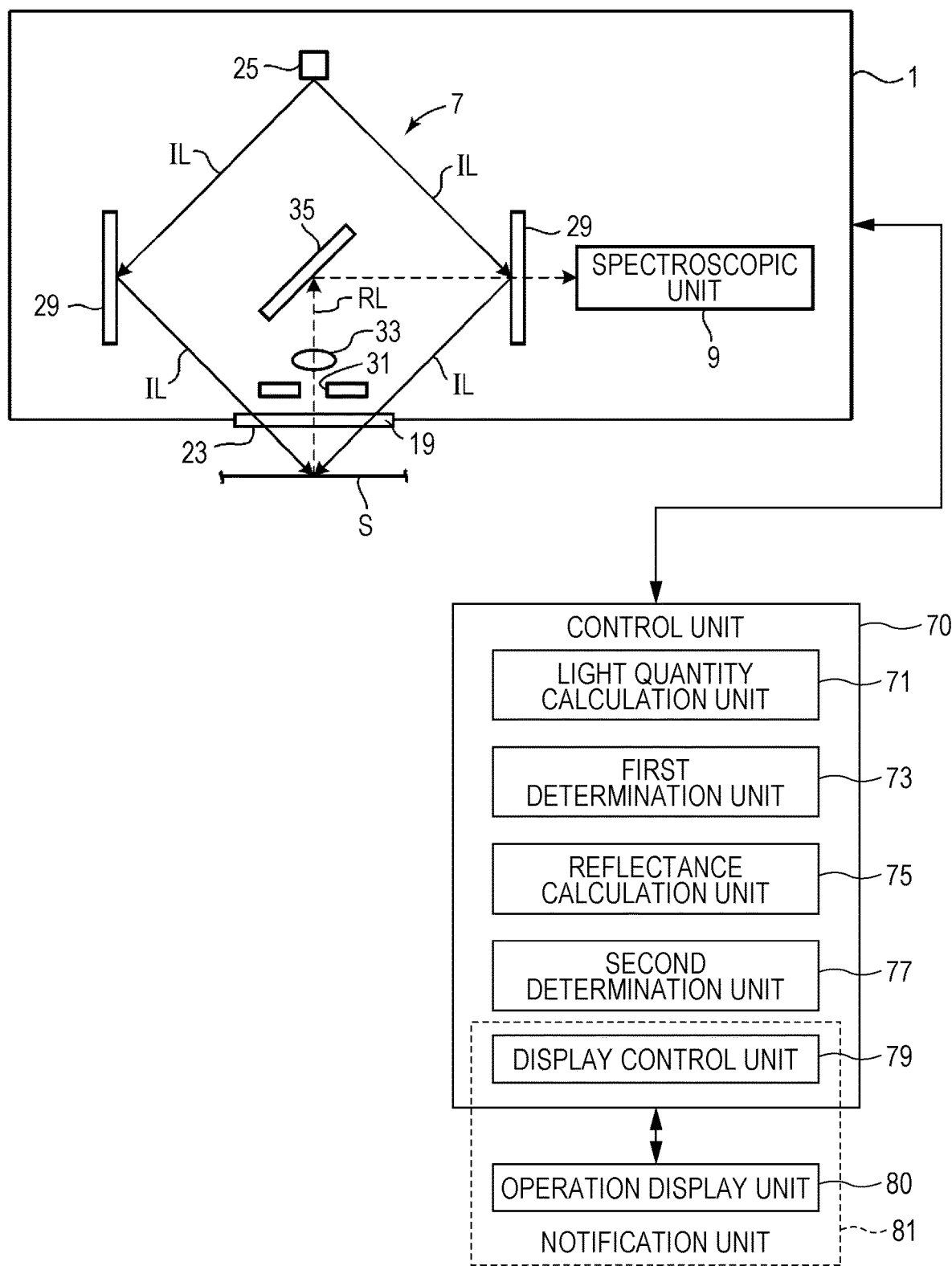
FIG. 7 is a block diagram illustrating a structure of the colorimetric sensor device according to the first embodiment.

FIG. 7 is a block diagram illustrating a structure of a colorimetric sensor device 60 according to the first embodiment. The colorimetric sensor device 60 is a color sensor and includes the control unit 70 and an operation display unit 80 in addition to the sensor head 1 described above.

FIG. 7 schematically illustrates main components of the illumination light reception unit 7 illustrated in FIG. 5. To the sample surface S, the illumination light IL is delivered at an angle of approximately 45° relative to the normal line of the sample surface S. The light reception lens 33 receives a component of the reflection light RL reflected on the sample surface S that transmits through the opening 31 in the normal line direction (at approximately 0°). In this embodiment, the geometry is 45°:0° but the angle of the illumination light flux IL to be delivered to the sample surface S is not limited to 45° and may be 60° or other angle. In addition, the angle at which the light reception lens 33 receives the reception light flux RL is not limited to 0°. The angle at which the illumination light flux IL is delivered to the sample surface S may be the normal line direction (approximately 0°) and the angle at which the light reception lens 33 receives the reception light flux RL may be 45°, for example. When the angles are set, it is desirable that the range of error is within ±5°.

The reflection light RL received by the light reception lens 33 is sent to the spectroscopic unit 9 as the colorimetric unit. The spectroscopic unit 9 generates electric signals representing the intensity levels of the wavelengths, and the sensor head 1 outputs these electric signals to the control unit 70.

As described above, the sensor head 1 converts the light received by the light reception lens 33 through the transparent member 19 into electric signals and outputs the signals.

The operation display unit 80 includes a touch panel. An operator of the colorimetric sensor device 60 manipulates the operation display unit 80 to manipulate the colorimetric sensor device 60.

The control unit 70 is a microcomputer that collectively controls the entire colorimetric sensor device 60. The control unit 70 includes a light quantity calculation unit 71, a first determination unit 73, a reflectance calculation unit 75, a second determination unit 77, and a display control unit 79.

The display control unit 79 controls to display the operation screen of the colorimetric sensor device 60 on the touch panel of the operation display unit 80. The display control unit 79 and the operation display unit 80 function as a notification unit 81.

The light quantity calculation unit 71 calculates the light quantity of the light received by the light reception lens 33 by using the electric signals output from the sensor head 1. More specifically, while the white calibration plate is set as the sample surface S, the sensor head 1 causes the illumination light IL to be emitted from the light source unit 25 and be delivered to the white calibration plate. Thus, the reflection light RL reflected on the white calibration plate is received by the light reception lens 33. The reflection light RL is the light generated when the illumination light IL is reflected on the sample surface S (white calibration plate), and is visible light (380 nm to 780 nm).

The spectroscopic unit 9 converts the reflection light RL received by the light reception lens 33 into the electric signals and then, the sensor head 1 outputs the electric signals. The light quantity calculation unit 71 stores the data of the formula for calculating the light quantity in advance. The light quantity calculation unit 71 calculates the light quantity of the reflection light RL received by the light reception lens 33 by using the formula and the electric signals output from the sensor head 1. The light quantity can be calculated using the known method.

The first determination unit 73 determines whether the light quantity calculated by the light quantity calculation unit 71 is less than or equal to a predetermined value. More specifically, the first determination unit 73 stores a first lower limit value and a second lower limit value of the light quantity in advance. The second lower limit value is higher than the first lower limit value, and a value more than the second lower limit value represents the light quantity enough to perform the colorimetry. A value less than or equal to the second lower limit value and more than the first lower limit value represents the light enough to perform the colorimetry though the accuracy of the colorimetry is a little lower than that when the value is more than the second lower limit value. A value less than or equal to the first lower limit value represents the light quantity not enough to perform the colorimetry.

The notification unit 81 performs a predetermined notification when the first determination unit 73 has determined that the light quantity is less than or equal to the predetermined value. The predetermined notification corresponds to, for example, step S6 in FIG. 10.

The display control unit 79 performs the predetermined notification by performing predetermined display in the operation display unit 80. Note that the notification unit 81 may generate a sound such as a buzzer to perform the predetermined notification. Alternatively, the notification unit 81 may communicate with an external device such as a personal computer to display the predetermined notification in a display unit of the external device.

When the first determination unit 73 has determined that the light quantity is less than or equal to the predetermined value, the reflectance calculation unit 75 calculates the reflectance of a first wavelength component on the short-wavelength side that is determined in advance and a second wavelength component on the long-wavelength side that is determined in advance in the reflection light RL received by the light reception lens 33.

Whether the reason why the decrease in light quantity of the reflection light RL received by the light reception lens 33 is because the mirror (the cylindrical mirror 29, the plane mirror 35) has deteriorated over time, or because of other phenomenon (for example, a large amount of paper dust adheres to the exposed surface 23 of the transparent member 19 or the light source unit 25 has deteriorated over time) is determined by using the reflectance. This will be described in detail below.

Figure 8:
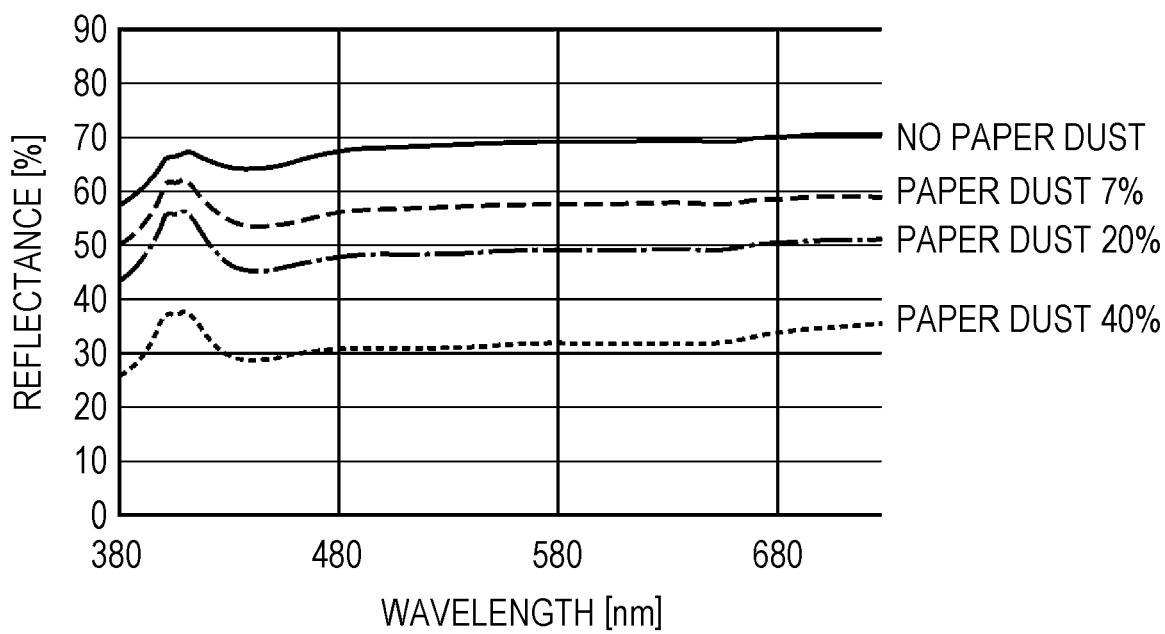
FIG. 8 is a graph expressing the relation between the reflectance and the wavelength of the colorimetric sensor device.

FIG. 8 is a graph expressing the relation between the reflectance and the wavelength of the colorimetric sensor device 60. The horizontal axis represents the wavelength and the vertical axis represents the reflectance. The reflectance is the reflectance of the white calibration plate. The area of the paper dust on the exposed surface 23 of the transparent member 19 (FIG. 7) is 0%, 7%, 20%, and 40% of the area of the exposed surface 23.

It is understood that as the paper dust adheres in larger area, the reflectance decreases. If the paper dust area is the same, the reflectance is approximately the same when the reflection light RL has a wavelength of 480 nm to 680 nm.

Figure 9:
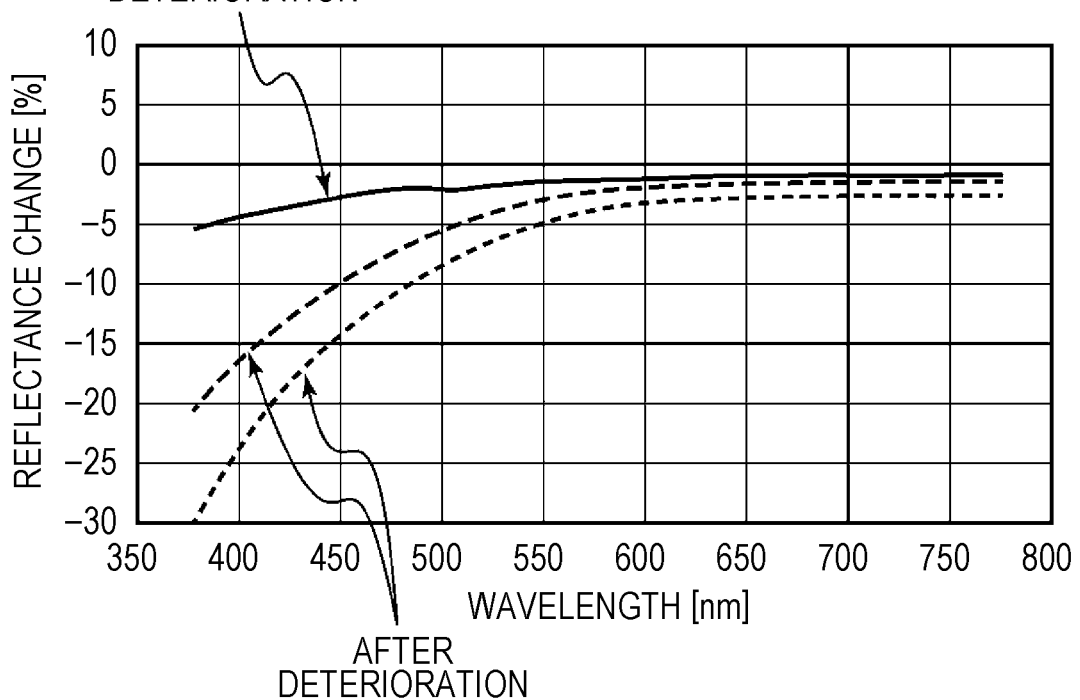
FIG. 9 is a graph expressing the relation between the change in reflectance and the wavelength of the colorimetric sensor device.

FIG. 9 is a graph expressing the relation between the change in reflectance and the wavelength of the colorimetric sensor device 60. The horizontal axis represents the wavelength and the vertical axis represents the change in reflectance. In regard to the change in reflectance, the reflectance of the white calibration plate before and after the mirror (the cylindrical mirror 29, the plane mirror 35) deteriorates over time is shown in percentage based on the reflectance when the mirror is new. The deterioration of the mirror over time is caused by the time, the humidity, and the like.

As the mirror deteriorates over time, the reflection light RL with a wavelength of 380 nm to 500 nm decreases in larger amount than the reflection light RL with a wavelength of 600 nm to 780 nm does.

In view of this, the reflectance calculation unit 75 calculates the reflectance of the white calibration plate in regard to each of the first wavelength component on the short-wavelength side including 380 nm to 500 nm (for example, a component with a wavelength of 480 nm) that is determined in advance and the second wavelength component on the long-wavelength side including 600 nm to 780 nm (for example, a component with a wavelength of 680 nm) that is determined in advance in the reflection light RL as the visible light. Note that, for example, the short-wavelength side can be rephrased as the wavelength of the blue or purple color and the long-wavelength side can be rephrased as the wavelength of the red color.

The second determination unit 77 stores a reference value of the reflectance of the white calibration plate in regard to each of the first wavelength component and the second wavelength component in advance. The reference value is the value when the mirror (the cylindrical mirror 29, the plane mirror 35) is new. The second determination unit 77 calculates each of the decrease in reflectance of the first wavelength component calculated by the reflectance calculation unit 75 relative to the reference value of the reflectance of the first wavelength component, and the decrease in reflectance of the second wavelength component calculated by the reflectance calculation unit 75 relative to the reference value of the reflectance of the second wavelength component.

If the decrease of the first wavelength component is larger than that of the second wavelength component, the second determination unit 77 determines that the mirror has deteriorated and if not, the second determination unit 77 determines that the cause is the phenomenon other than the mirror deterioration.

Figure 10:
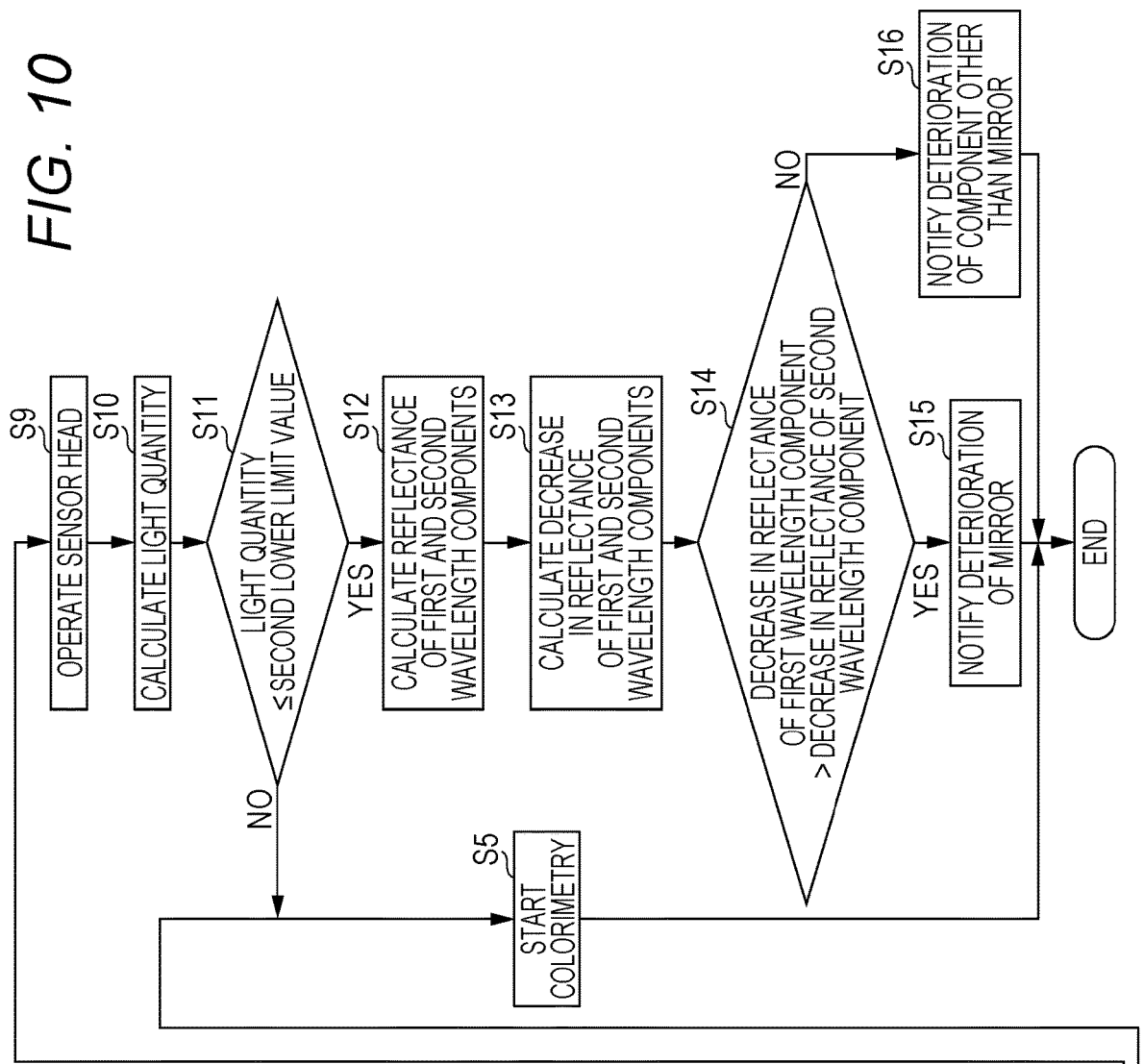
FIG. 10 is a flowchart for describing the operation of the colorimetric sensor device according to the first embodiment (No. 1).
Figure 10:
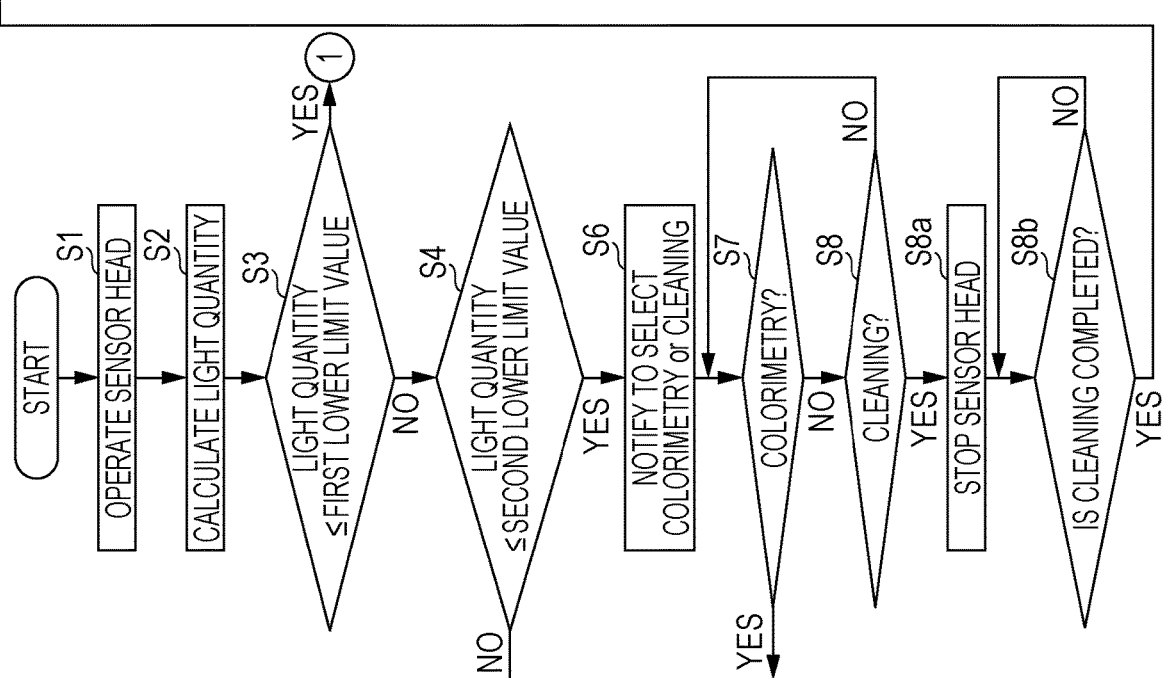
Figure 11:
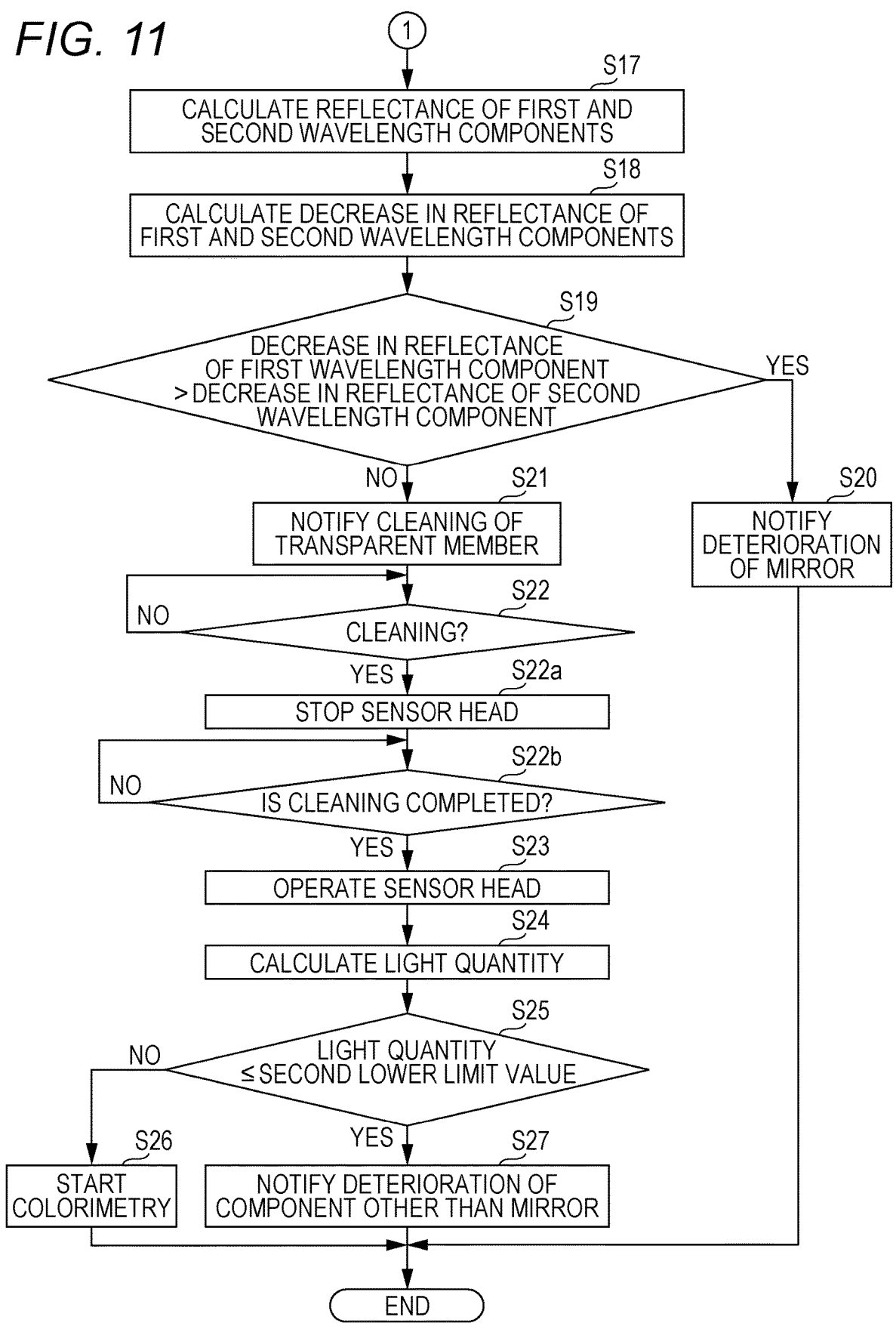
FIG. 11 is a flowchart for describing the operation of the colorimetric sensor device according to the first embodiment (No. 2).

As described in the paragraph of Background Art, the image formation apparatus that executes the printing at high speed (for example, the printing speed is 100 or more sheets per minute) generates a large amount of paper dust. Therefore, a large amount of paper dust adheres to the exposed surface 23 of the transparent member 19 shown in FIG. 5. This example will be described with reference to FIG. 7, FIG. 10, and FIG. 11 in regard to the operation of the colorimetric sensor device 60 according to the first embodiment. FIG. 10 and FIG. 11 are the flowcharts for describing the operation.

With reference to FIG. 7 and FIG. 10, in order to measure the light quantity before starting the colorimetry, the control unit 70 operates the sensor head 1 in the state that the white calibration plate is disposed as the sample surface S (step S1). The timing to operate the sensor head 1 is, in the case of the image formation apparatus, for example, when the color calibration is performed. The sensor head 1 operates to cause the illumination light IL to be emitted from the light source unit 25 and delivered to the white calibration plate. The reflection light RL reflected on the white calibration plate is converted into electric signals and then the signals are output.

The light quantity calculation unit 71 calculates the light quantity of the reflection light RL reflected on the white calibration plate by using the electric signals output in step S1 (step S2).

The first determination unit 73 determines whether the light quantity calculated in step S2 is less than or equal to the first lower limit value (step S3). The value less than or equal to the first lower limit value represents the light quantity not enough to perform the colorimetry.

If the first determination unit 73 has determined that the light quantity calculated in step S2 is more than the first lower limit value (No in step S3), the first determination unit 73 then determines whether the light quantity calculated in step S2 is less than or equal to the second lower limit value (step S4). The value less than or equal to the second lower limit value and more than the first lower limit value represents the light quantity enough to perform the colorimetry though the accuracy of the colorimetry is a little low.

If the first determination unit 73 has determined that the light quantity calculated in step S2 is more than the second lower limit value (No in step S4), the light enough to perform the colorimetry is received by the light reception lens 33 and thus the colorimetric sensor device 60 starts the colorimetry (step S5).

If the first determination unit 73 has determined that the light quantity calculated in step S2 is less than or equal to the second lower limit value (Yes in step S4), i.e., that the light quantity calculated in step S2 is less than or equal to the second lower limit value and more than the first lower limit value, the colorimetric sensor device 60 advances the process to step S6.

On the operation display unit 80, the display control unit 79 displays the key for selecting whether to perform the colorimetry or clean the exposed surface 23 of the transparent member 19 (step S6). This corresponds to a specific example of the predetermined notification. When an operator of the colorimetric sensor device 60 presses the key for selecting the colorimetry (Yes in step S7), the colorimetric sensor device 60 starts the colorimetry (step S5).

When the operator of the colorimetric sensor device 60 presses the key for selecting the cleaning (No in step S7, Yes in step S8), the control unit 70 stops the operation of the sensor head 1 (step S8a) and the display control unit 79 displays on the operation display unit 80, a cleaning completed key which the operator presses when having finished the cleaning.

The control unit 70 determines whether the cleaning completed key on the operation display unit 80 has been pressed or not (step S8b). If the operator has not pressed the cleaning completed key (No in step S8b), the control unit 70 repeats the process in step S8b. If the operator presses the cleaning completed key after finishing the cleaning of the exposed surface 23 of the transparent member 19 (Yes in step S8b), the control unit 70 operates the sensor head 1 (step S9). Then, the light quantity calculation unit 71 calculates the light quantity (step S10). Step S9 is the same as step S1 and step S10 is the same as step S2; thus, the description is omitted.

The first determination unit 73 determines whether the light quantity calculated in step S10 is less than or equal to the second lower limit value or not (step S11).

If the first determination unit 73 has determined that the light quantity calculated in step S10 is more than the second lower limit value (No in step S11), the colorimetric sensor device 60 starts the colorimetry (step S5). The cause of the lack of light quantity of the reflection light RL received by the light reception lens 33 (Yes in step S4) is the dust (for example, paper dust) on the exposed surface 23 of the transparent member 19 and by removing the dust from the exposed surface 23, the light quantity of the reflection light RL is recovered.

If the first determination unit 73 has determined that the light quantity calculated in step S10 is less than or equal to the second lower limit value (Yes in step S11), i.e., if the light quantity of the reflection light RL received by the light reception lens 33 is not recovered even after the exposed surface 23 of the transparent member 19 is cleaned, the colorimetric sensor device 60 advances the process to step S12.

The reflectance calculation unit 75 calculates the reflectance of the first wavelength component (for example, the component with a wavelength of 480 nm) and the second wavelength component (for example, the component with a wavelength of 680 nm) of the reflection light RL reflected on the white calibration plate by using the electric signals output from the sensor head 1 in step S9 (step S12).

The second determination unit 77 calculates the decrease in reflectance of the first wavelength component calculated in step S12 relative to the reference value of the reflectance of the first wavelength component and the decrease in reflectance of the second wavelength component calculated in step S12 relative to the reference value of the reflectance of the second wavelength component (step S13).

If the second determination unit 77 has determined that the decrease of the first wavelength component is larger than that of the second wavelength component (Yes in step S14), the display control unit 79 displays on the operation display unit 80, the image notifying that the mirror (the cylindrical mirror 29, the plane mirror 35) of the sensor head 1 has deteriorated and the mirror or the sensor head 1 should be exchanged (step S15).

If the second determination unit 77 has determined that the decrease in reflectance of the first wavelength component is not larger than that of the second wavelength component (No in step S14), the display control unit 79 displays on the operation display unit 80, the image notifying that the components other than the mirror (for example, the light source unit 25) has deteriorated and that component or the sensor head 1 should be exchanged (step S16).

If the first determination unit 73 has determined that the light quantity calculated in step S2 is less than or equal to the first lower limit value (Yes in step S3), the reflectance calculation unit 75 calculates the reflectance of the first wavelength component (for example, the component with a wavelength of 480 nm) and the second wavelength component (for example, the component with a wavelength of 680 nm) of the reflection light RL reflected on the white calibration plate by using the electric signals output from the sensor head 1 in step S1 with reference to FIG. 7 and FIG. 11 (step S17).

The second determination unit 77 calculates the decrease in reflectance of the first wavelength component calculated in step S17 relative to the reference value of the reflectance of the first wavelength component and the decrease in reflectance of the second wavelength component calculated in step S17 relative to the reference value of the reflectance of the second wavelength component (step S18).

If the second determination unit 77 has determined that the decrease of the first wavelength component is larger than that of the second wavelength component (Yes in step S19), the display control unit 79 displays on the operation display unit 80, the image notifying that the mirror (the cylindrical mirror 29, the plane mirror 35) of the sensor head 1 has deteriorated and the mirror or the sensor head 1 should be exchanged (step S20).

If the second determination unit 77 has determined that the decrease of the first wavelength component is not larger than that of the second wavelength component (No in step S19), the display control unit 79 displays on the operation display unit 80, the image to encourage the cleaning of the exposed surface 23 of the transparent member 19 and the key for selecting the cleaning (step S21). In this stage, it is not known yet whether the decrease in light quantity of the reflection light RL received by the light reception lens 33 is caused by the dust on the exposed surface 23 of the transparent member 19 or by the deterioration of the optical component of the sensor head 1 other than the mirror (for example, the light source unit 25). In view of this, the first determination unit 73 determines the cause after the exposed surface 23 of the transparent member 19 is cleaned. In order to check whether the light source unit 25 out of the optical components other than the mirror has deteriorated or not, a sensor that monitors the light quantity from the light source unit 25 may be additionally provided.

The control unit 70 determines whether the key for selecting the cleaning has been pressed or not (step S22). If the operator of the colorimetric sensor device 60 has not pressed the key for selecting the cleaning (No in step S22), the control unit 70 repeats the process of step S22. If the operator of the colorimetric sensor device 60 has pressed the key for selecting the cleaning (Yes in step S22), the control unit 70 stops the operation of the sensor head 1 (step S22a) and the display control unit 79 displays on the operation display unit 80, the cleaning completed key that the operator presses when having finished the cleaning.

The control unit 70 determines whether the cleaning completed key displayed on the operation display unit 80 has been pressed or not (step S22b). If the operator has not pressed the cleaning completed key (No in step S22b), the control unit 70 repeats the process of step S22b. If the operator has pressed the cleaning completed key after cleaning the exposed surface 23 of the transparent member 19 (Yes in step S22b), the control unit 70 operates the sensor head 1 (step S23). Then, the light quantity calculation unit 71 calculates the light quantity (step S24). Step S23 is the same as step S1 and step S24 is the same as step S2, and thus the description thereto is omitted.

The first determination unit 73 determines whether the light quantity calculated in step S24 is less than or equal to the second lower limit value or not (step S25). The first lower limit value is not used as the threshold because of the following reason. If the decrease in light quantity of the reflection light RL received by the light reception lens 33 (Yes in step S3) is because of the dust on the exposed surface 23 of the transparent member 19, cleaning the exposed surface 23 will make the light quantity exceed the second lower limit value.

If the first determination unit 73 has determined that the light quantity calculated in step S24 is more than the second lower limit value (No in step S25), the colorimetric sensor device 60 starts the colorimetry (step S26). The reason why the light quantity has decreased is the dust on the exposed surface 23 of the transparent member 19, and by removing the dust from the exposed surface 23, the light quantity of the reflection light RL is recovered.

If the first determination unit 73 has determined that the light quantity calculated in step S24 is less than or equal to the second lower limit value (Yes in step S25), the display control unit 79 displays on the operation display unit 80, the image notifying that the component of the sensor head 1 other than the mirror (for example, the light source unit 25) has deteriorated and that component or the sensor head 1 should be exchanged (step S27).

The main effect of the first embodiment is described. With reference to FIG. 7, attention is paid to the fact that as more dust such as the paper dust adheres to the exposed surface 23 of the transparent member 19 (i.e., the dust area is increased), the light quantity of the light received by the light reception lens 33 through the transparent member 19 decreases in the colorimetric sensor device 60 according to the first embodiment. If the first determination unit 73 has determined that the light quantity of the light received by the light reception lens 33 is less than or equal to the predetermined value (Yes in step S4), it is regarded that a predetermined amount or more of dust adheres to the exposed surface 23 of the transparent member 19 and the notification unit 81 performs the predetermined notification (step S6). Therefore, the colorimetric sensor device 60 according to the first embodiment can prevent the deterioration in colorimetric accuracy in the circumstances where the dust is generated.

Moreover, in regard to the colorimetric sensor device 60 according to the first embodiment, attention is paid to the fact that when the mirror disposed in the housing 20 (FIG. 5) of the sensor head 1 (the cylindrical mirror 29, the plane mirror 35) has deteriorated over time, the light quantity of the reflection light RL received by the light reception lens 33 decreases and the decrease in reflectance of the wavelength component on the short-wavelength side is larger than that of the wavelength component on the long-wavelength side in the reflection light RL (visible light). In the colorimetric sensor device 60 according to the first embodiment, whether the decrease in light quantity of the reflection light RL received by the light reception lens 33 is because of the deterioration of the mirror over time or not can be determined (step S14, step S15, step S19, step S20).

Figure 12:
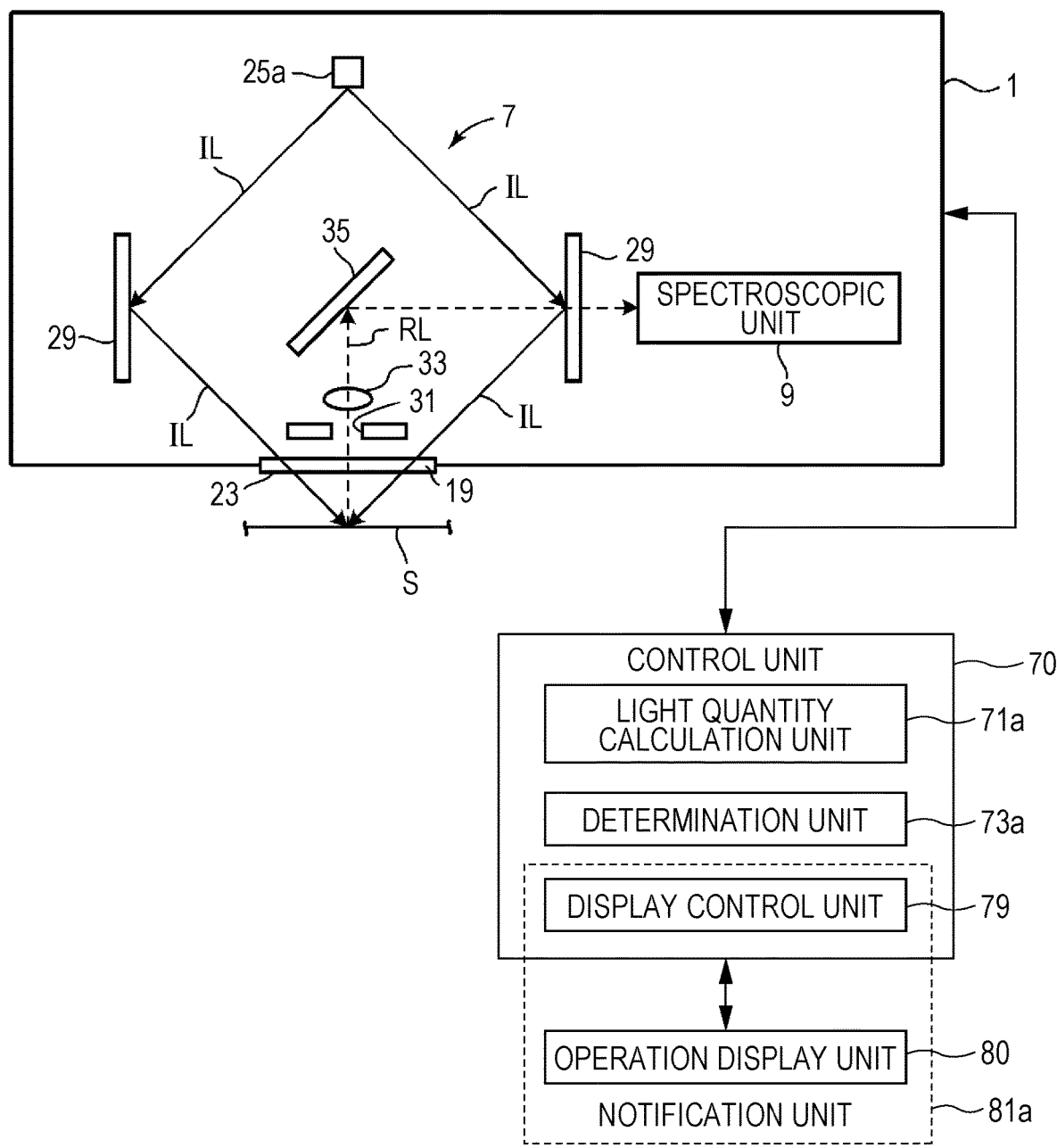
FIG. 12 is a block diagram illustrating a structure of a colorimetric sensor device according to a second embodiment.

A second embodiment will be described. FIG. 12 is a block diagram illustrating a structure of a colorimetric sensor device 60a according to a second embodiment. The point of the colorimetric sensor device 60a according to the second embodiment that is different from the structure of the colorimetric sensor device 60 according to the first embodiment illustrated in FIG. 7 will be described.

The colorimetric sensor device 60a includes a light source unit 25a instead of the light source unit 25 (FIG. 7). The light source unit 25a includes a white LED (one example of a first light source unit) and an ultraviolet LED (one example of a second light source unit), and can emit one of the white illumination light IL and the ultraviolet ray by switching.

When the color of the sample surface S is measured, the control unit 70 causes the white LED of the light source unit 25a to emit the white illumination light IL.

As more paper dust adheres to the exposed surface 23 of the transparent member 19, the light reception lens 33 receives less reflection light RL and thus, the accuracy of the colorimetry deteriorates. In view of this, before the start of the colorimetry, whether the light quantity is insufficient because of the paper dust on the exposed surface 23 or not is examined. Here, the control unit 70 causes the ultraviolet LED of the light source unit 25a to emit the ultraviolet ray.

Sheets contain the fluorescent. Therefore, irradiating the paper dust with the ultraviolet ray causes the paper dust to emit light. As the paper dust increases, more light is emitted.

The ultraviolet ray emitted from the light source unit 25a is reflected on the cylindrical mirror 29 and delivered to the white calibration plate as the sample surface S. The ultraviolet ray reflected on the white calibration plate is delivered to the exposed surface 23 of the transparent member 19. Thus, the light received by the light reception lens 33 is converted into the electric signals in the spectroscopic unit 9 and the sensor head 1 sends the electric signals to the control unit 70.

The control unit 70 illustrated in FIG. 12 includes a light quantity calculation unit 71a and a determination unit 73a instead of the light quantity calculation unit 71, the first determination unit 73, the reflectance calculation unit 75, and the second determination unit 77 illustrated in FIG. 7.

When the exposed surface 23 with the paper dust thereon is irradiated with the ultraviolet ray from the light source unit 25a, the light quantity calculation unit 71a calculates the light quantity of the light received by the light reception lens 33 by using the electric signals output from the sensor head 1.

The determination unit 73a determines whether the light quantity calculated by the light quantity calculation unit 71a is more than or equal to the predetermined value or not. The determination unit 73a stores this value in advance. The predetermined value is described below.

It is assumed that when a predetermined amount (i.e., a predetermined area) of paper dust adheres to the exposed surface 23, the white calibration plate is irradiated with the illumination light IL and the light quantity of the reflection light RL reflected on the white calibration plate is not enough to secure the accuracy of the colorimetry (for example, the value less than or equal to the first lower limit value). The light quantity of the visible light received by the light reception lens 33 by irradiating the exposed surface 23 with the ultraviolet ray when the amount of the paper dust on the exposed surface 23 is the predetermined amount is obtained in advance and this value is used as the predetermined value.

The colorimetric sensor device 60*a* includes a notification unit 81*a* instead of the notification unit 81 illustrated in FIG. 7. The notification unit 81*a* performs the predetermined notification (for example, the notification to encourage the cleaning of the exposed surface 23 of the transparent member 19) when the determination unit 73*a* has determined that the light quantity is more than or equal to the predetermined value.

Figure 13:
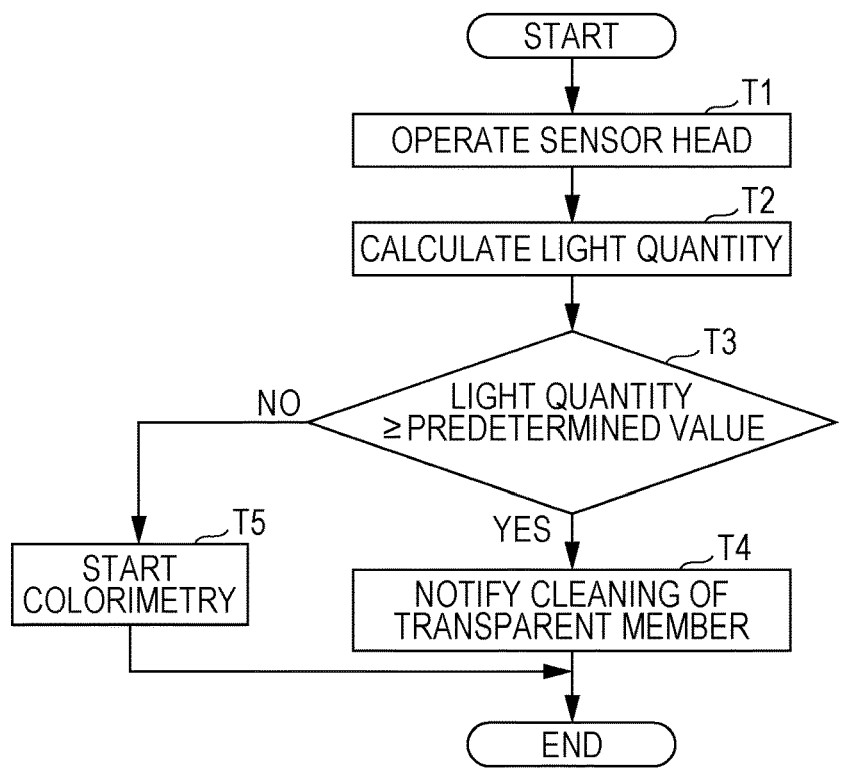
FIG. 13 is a flowchart for describing the operation of the colorimetric sensor device according to the second embodiment.

The operation of the colorimetric sensor device 60*a* according to the second embodiment is described. FIG. 13 is the flowchart for describing the operation. With reference to FIG. 12 and FIG. 13, in order to measure the light quantity before starting the colorimetry, the control unit 70 operates the sensor head 1 in the state that the white calibration plate is disposed as the sample surface S (step T1). The timing to operate the sensor head 1 is, in the case of the image formation apparatus for example, when the color calibration is performed. The sensor head 1 operates to cause the ultraviolet ray to be emitted from the light source unit 25*a* and delivered to the white calibration plate. The ultraviolet ray reflected on the white calibration plate is delivered to the exposed surface 23 and thus, the light received by the light reception lens 33 is converted into electric signals and then output.

The light quantity calculation unit 71*a* calculates the light quantity of the light generated from the paper dust adhering to the exposed surface 23 by using the electric signals output in step T1 (step T2).

The determination unit 73*a* determines whether the light quantity calculated in step T2 is more than or equal to the predetermined value (step T3).

If the determination unit 73*a* has determined that the light quantity calculated in step T2 is not more than the predetermined value (No in step T3), the amount of paper dust on the exposed surface 23 is not the value that deteriorates the accuracy of the colorimetry. Therefore, the colorimetric sensor device 60*a* starts the colorimetry (step T5).

If the determination unit 73*a* has determined that the light quantity calculated in step T2 is more than or equal to the predetermined value (Yes in step T3), the display control unit 79 displays on the operation display unit 80, the image to encourage the cleaning of the exposed surface 23 of the transparent member 19 (step T4).

In the colorimetric sensor device 60*a* according to the second embodiment, attention is paid to the following point. Recently used sheets (especially, recycled paper) contain the fluorescent. Therefore, irradiating the paper dust with the ultraviolet ray will cause the paper dust to emit light. As more paper dust is generated (i.e., the dust area is increased), more light is emitted. In the colorimetric sensor device 60*a* according to the second embodiment, the light quantity calculation unit 71*a* calculates the light quantity of the light received by the light reception lens 33 when the transparent member 19 with the paper dust thereon is irradiated with the ultraviolet ray. If the determination unit 73*a* has determined that the light quantity is more than or equal to the predetermined value, it is regarded that a predetermined amount or more of paper dust adheres to the exposed surface 23 of the transparent member 19 and the notification unit 81*a* performs a predetermined notification (for example, the notification to encourage the cleaning of the transparent member 19). Therefore, the colorimetric sensor device 60*a* according to the second embodiment can prevent the deterioration in colorimetric accuracy in the circumstances where the paper dust is generated.

In the colorimetric sensor device 60 according to the first embodiment and the colorimetric sensor device 60*a* according to the second embodiment, the colorimetric unit preforms the colorimetry using the spectro-colorimetry (the embodiment in which the colorimetric unit is the spectroscopic unit) but the present invention is not limited thereto, and the tristimulus value direct reading method may be used in the colorimetry.

Figure 14:
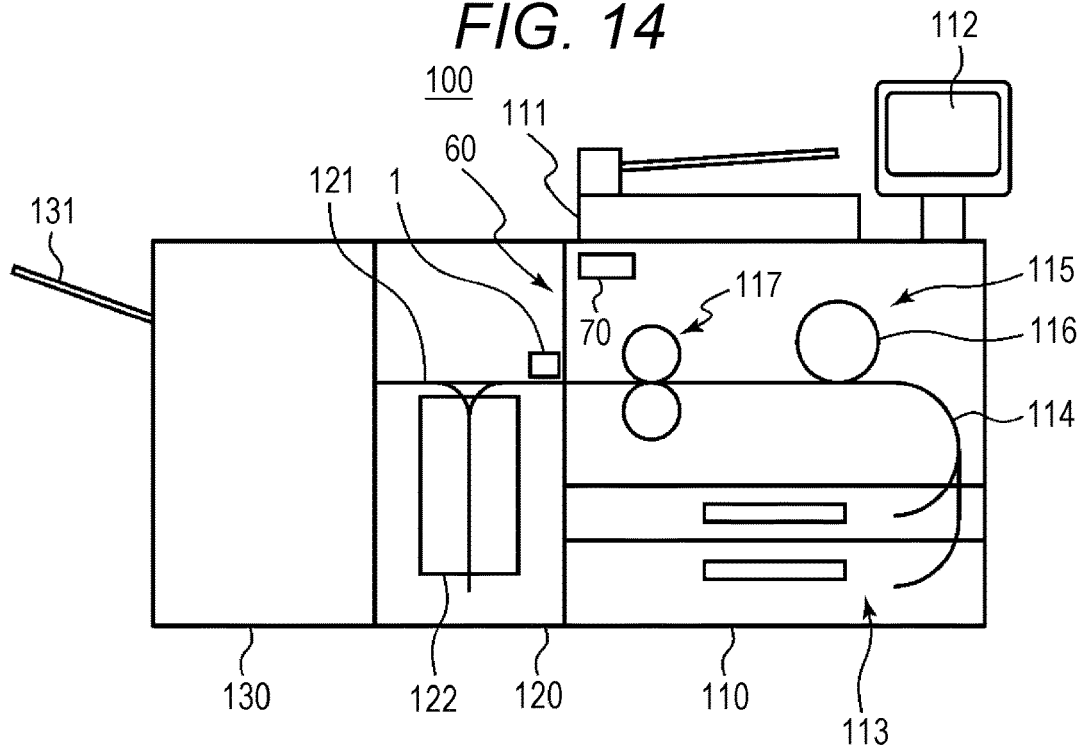
FIG. 14 is a schematic view illustrating an image formation apparatus in which the colorimetric sensor device according to the first embodiment is used.

The colorimetric sensor device 60 according to the first embodiment and the colorimetric sensor device 60*a* according to the second embodiment can be used for the image formation apparatus. This is described based on an example in which the colorimetric sensor device 60 according to the first embodiment is used. FIG. 14 is a schematic view illustrating an image formation apparatus 100 in which the colorimetric sensor device 60 according to the first embodiment is used. The colorimetric sensor device 60 is to measure the color of the color patch formed on the sheet conveyed along a conveyance path 121 in the color calibration.

The image formation apparatus 100 is a production printer, and the printing speed is 100 or more sheets per minute. The image formation apparatus 100 includes an image formation apparatus main body 110, a relay device 120, and a post-process device 130.

The image formation apparatus main body 110 includes an automatic document feeder device 111 disposed on the upper part thereof. The document fed by the automatic document feeder device 111 is read by a scanner, which is not shown. Note that the document can alternatively be read on a platen glass, which is not shown.

The image formation apparatus main body 110 includes an operation display unit 112 disposed on the upper side thereof. The operation display unit 112 includes a touch panel, on which the operator's manipulation and the information display are possible. The operation display unit 112 has a function of the operation display unit 80 of the colorimetric sensor device 60 (FIG. 7).

The image formation apparatus main body 110 includes a plurality of paper feeding trays 113 disposed on the lower side thereof.

In the image formation apparatus main body 110, the control unit 70 of the colorimetric sensor device 60 is disposed.

In the image formation apparatus main body 110, a conveyance path 114 to convey the sheets fed from the paper feeding tray 113 is provided. In the middle of the conveyance path 114, an image formation unit 115 is provided.

The image formation unit 115 includes a photoreceptor 116, and a charger, an LD, a developer, and a transferring unit, which are not shown, around the photoreceptor 116. In the conveyance path 114 on the downstream side of the photoreceptor 116, a fixer 117 is disposed.

On the downstream side of the fixer 117, the conveyance path 114 extends to be connected to the conveyance path 121 of the relay device 120.

The image formation apparatus main body 110 forms an image represented by the image data on the sheet conveyed along the conveyance path 114 by the electrophotography method. The sheet with the image formed thereon is conveyed to the fixer 117.

The fixer 117 heats the conveyed sheet so that the image is fixed on the sheet. The sheet after the fixing process is conveyed to the relay device 120 by the conveyance path 114.

The relay device 120 includes the conveyance path 121 connected to the conveyance path 114 and moreover to the post-process device 130 in the subsequent stage. The relay device 120 includes an inversion/stack unit 122 where a predetermined number of sheets conveyed along the conveyance path 121 are inverted or stacked. The sheets stacked in the inversion/stack unit 122 are conveyed to the post-process device 130 side at a predetermined timing.

In the conveyance path 121, the sensor head 1 of the colorimetric sensor device 60 is disposed on the upstream side of the inversion/stack unit 122.

The post-process device 130 executes a predetermined post-process such as punching, folding, and saddle-stitching and stapling. The sheets conveyed from the relay device 120 is subjected to the predetermined post-process in the post-process device 130, and then discharged to a discharging unit 131.

The colorimetric sensor device has been described as the example of the sensor device but the sensor device is not limited to the one in the colorimetric field and the present invention is also applicable to other fields.

Summary of Embodiments

The sensor device according to the first aspect includes: the sensor head that includes the housing with the light passage port, the light reception lens housed in the housing, and the transparent member disposed at the passage port, converts the light received by the light reception lens through the transparent member into electric signals, and outputs the signals; the light quantity calculation unit that calculates the light quantity of the light received by the light reception lens by using the electric signals output from the sensor head; the first determination unit that determines whether the light quantity calculated by the light quantity calculation unit is less than or equal to the predetermined value or not; and the notification unit that performs the predetermined notification when the first determination unit has determined that the light quantity is less than or equal to the predetermined value.

In the sensor device according to the first aspect, attention is paid to the fact that as more dust adheres to the transparent member (i.e., the dust area is increased), the light reception lens receives less light through the transparent member. If the first determination unit has determined that the light quantity of the light received by the light reception lens is less than or equal to the predetermined value, it is regarded that a predetermined amount or more of dust adheres to the transparent member and the notification unit performs the predetermined notification. Therefore, in the sensor device according to the first aspect, the deterioration in measurement accuracy under the circumstances where the dust is generated can be prevented.

In the above structure, the sensor head includes one or more mirrors including the mirror that is housed in the housing, reflects the illumination light emitted from the light source unit, and irradiates the sample surface with the illumination light through the transparent member, wherein the light reception lens receives the reflection light reflected on the sample surface through the transparent member.

In this structure, the sensor device according to the first aspect of the present invention is used for the aspect in which the housing of the sensor head has the light passage port that serves as the outlet for the light to be delivered to the sample surface and also as the inlet for the light reflected on the sample surface.

In the above structure, the reflectance calculation unit that calculates the reflectance of the first wavelength component on the short-wavelength side that is determined in advance and the second wavelength component on the long-wavelength side that is determined in advance in the reflection light received by the light reception lens when the first determination unit has determined that the light quantity is less than or equal to the predetermined value, and the second determination unit that calculates the decrease in reflectance of the first wavelength component calculated by the reflectance calculation unit relative to the reference value of the reflectance of the first wavelength component and the decrease in reflectance of the second wavelength component calculated by the reflectance calculation unit relative to the reference value of the reflectance of the second wavelength component and determines that the one or more mirrors have deteriorated if the decrease of the first wavelength component is larger than that of the second wavelength component are provided. The notification unit notifies the deterioration of the one or more mirrors when the second determination unit has determined the deterioration of the one or more mirrors.

In this structure, attention is paid to the fact that when the mirror disposed in the housing of the sensor head has deteriorated over time, the light quantity of the reflection light received by the light reception lens decreases and the decrease in reflectance of the wavelength component on the short-wavelength side is larger than that of the reflectance of the wavelength component on the long-wavelength side in the reflection light (visible light). In this structure, whether the decrease in light quantity of the reflection light received by the light reception lens is because of the deterioration of the mirror over time or not can be determined.

The sensor device according to the second aspect includes: the sensor head that includes the housing with the light passage port, the transparent member disposed in the passage port, the first light source unit housed in the housing and emitting the illumination light to be delivered to the sample surface through the transparent member, and the light reception lens housed in the housing and receiving the reflection light reflected on the sample surface through the transparent member, converts the reflection light received by the light reception lens through the transparent member into electric signals, and outputs the electric signals; the second light source unit that irradiates the transparent member with the ultraviolet ray; the light quantity calculation unit that calculates the light quantity of the light received by the light reception lens by using the electric signals output from the sensor head when the transparent member is irradiated with the ultraviolet ray from the second light source unit; the determination unit that determines whether the light quantity calculated by the light quantity calculation unit is more than or equal to the predetermined value or not; and the notification unit that performs the predetermined notification when the determination unit has determined that the light quantity is more than or equal to the predetermined value.

In regard to the sensor device according to the second aspect, attention is paid to the following point. Recently used sheets (especially, recycled paper) contain the fluorescent. Therefore, irradiating the paper dust with the ultraviolet ray will cause the paper dust to emit light. As more paper dust is generated (i.e., the dust area is increased), more light is emitted. In the sensor device according to the second aspect, the light quantity calculation unit calculates the light quantity of the light received by the light reception lens when the transparent member with the paper dust thereon is irradiated with the ultraviolet ray. If the determination unit has determined that the light quantity is more than or equal to the predetermined value, it is regarded that a predetermined amount or more of paper dust adheres to the transparent member and the notification unit performs a predetermined notification (for example, the notification to encourage the cleaning of the transparent member). Therefore, the colorimetric sensor device according to the second aspect can prevent the deterioration in measurement accuracy in the circumstances where the paper dust is generated.

The image formation apparatus according to the third aspect includes the conveyance path where the sheets are conveyed, the image formation unit where the image represented by the image data is formed on the sheet conveyed along the conveyance path, and the sensor device that measures the color of the image formed on the sheet.

The image formation apparatus according to the third aspect includes the sensor device according to the first aspect or the second aspect; therefore, this apparatus has the operation effect similar to that of the sensor device according to the first aspect or the second aspect.

The entire disclosure of Japanese Patent Application No. 2014-248001 filed on Dec. 8, 2014 including description, claims, drawings, and abstract are incorporated herein by reference in its entirety.

To express the present invention, the present invention has been described appropriately and sufficiently through the embodiments as above with reference to the drawings, but it is to be understood that those who are skilled in the art can easily modify and/or improve the above embodiments. Thus, such modifications or improvements made by those who are skilled in the art are construed as being included in the scope of claims, unless those modifications and improvements depart from the scope of rights according to the scope of claims.

The invention claimed is:

1. A colorimetric sensor device comprising:
   a sensor head that includes a housing with a light passage port, a light reception lens housed in the housing, a transparent member disposed at the passage port, and a colorimetric unit converting light received by the light reception lens through the transparent member into an electric signal, and outputs the electric signal;
   a light quantity calculation unit that calculates a light quantity of the light received by the light reception lens by using the electric signal output from the sensor head;
   a first determination unit that determines whether the light quantity calculated by the light quantity calculation unit is less than or equal to a predetermined value;
   a notification unit that performs a predetermined notification when the first determination unit has determined that the light quantity is less than or equal to the predetermined value;
   a reflectance calculation unit that calculates reflectance of a first wavelength component on a short-wavelength side that is determined in advance and reflectance of a second wavelength component on a long-wavelength side that is determined in advance in the reflection light received by the light reception lens when the first determination unit has determined that the light quantity is less than or equal to the predetermined value; and
   a second determination unit that calculates a decrease in reflectance of the first wavelength component calculated by the reflectance calculation unit relative to a reference value of the reflectance of the first wavelength component and a decrease in reflectance of the second wavelength component calculated by the reflectance calculation unit relative to a reference value of the reflectance of the second wavelength component and determines that the one or more mirrors have deteriorated if the decrease of the first wavelength component is lamer than that of the second wavelength component,
   wherein the notification unit notifies deterioration of the one or more mirrors when the second determination unit has determined the deterioration of the one or more mirrors.

2. The colorimetric sensor device according to claim 1, wherein
   the sensor head further includes one or more mirrors including a mirror that is housed in the housing, reflects illumination light emitted from a light source unit, and irradiates a sample surface with the illumination light through the transparent member, and
   the light reception lens receives reflection light reflected on the sample surface through the transparent member.

3. The colorimetric sensor device according to claim 1, further comprising a third determination unit that determines that dust is on the transparent member if the decrease of the first wavelength component is smaller than that of the second wavelength component,
   wherein the notification unit makes a notification for prompting cleaning of the transparent member when the third determination unit has determined that dust is on the transparent member.

4. The colorimetric sensor device according to claim 1, wherein the light source emits an ultraviolet ray.

5. The colorimetric sensor device according to claim 4, wherein the light source unit emits one of white light and the ultraviolet ray by switching.

6. An image formation apparatus comprising:
   a conveyance path where a sheet is conveyed;
   an image formation unit where an image represented by image data is formed on the sheet conveyed along the conveyance path; and
   the colorimetric sensor device according to claim 1 that measures a color of the image formed on the sheet.

* * * * *